United States Patent [19]

Murase

[11] Patent Number: 5,703,870
[45] Date of Patent: Dec. 30, 1997

[54] CONGESTION CONTROL METHOD

[75] Inventor: Tutomu Murase, Tokyo, Japan

[73] Assignee: NEC Corporation, Tokyo, Japan

[21] Appl. No.: 557,554

[22] Filed: Nov. 14, 1995

[30] Foreign Application Priority Data

Nov. 14, 1994 [JP] Japan ................................ 6-278917

[51] Int. Cl.⁶ .................................................. H04L 12/00
[52] U.S. Cl. ........................................ 370/232; 370/235
[58] Field of Search .................................. 370/229, 230, 370/232, 233, 234, 235, 389, 395, 400, 412, 413, 414, 415, 416, 417, 418

[56] References Cited

U.S. PATENT DOCUMENTS

| | | | |
|---|---|---|---|
| 5,090,011 | 2/1992 | Fukuta et al. | 370/230 |
| 5,280,470 | 1/1994 | Buhrke et al. | 370/232 |
| 5,311,513 | 5/1994 | Ahmadi et al. | 370/230 |
| 5,446,726 | 8/1995 | Rostoker et al. | 370/232 |
| 5,457,687 | 10/1995 | Newman | 370/232 |
| 5,463,620 | 10/1995 | Sriram | 370/412 |
| 5,497,375 | 3/1996 | Hluchyj et al. | 370/232 |
| 5,533,009 | 7/1996 | Chen | 370/232 |
| 5,633,861 | 5/1997 | Hanson et al. | 370/232 |

OTHER PUBLICATIONS

K. Imai, "Technical Outputs and Issues at the ATM Forum", Technical Report of IEICE, IN94–39, (1994–05), pp. 1–8.

C. Ikeda et al., "Standarization Aspects of Congestion Control Schemes for Best Effort Class in ATM Networks", Technical Report of IEICE, IN94–41, (1994–05), pp. 15–21.

P.E. Boyer et al., "Spacing Cells Protects and Enhances Utilization of ATM Network Links", IEEE Network, (1992) pp. 38–49.

ATM User–Network Interface Specification Version 3.0, (1993), pp. 2–10 and pp. 91–103.

International Telecommunication Union ITU–T Recommendation 1.371, (1993), pp. 1–26.

Tominaga et al., "Easy–to–Understand BIDN Technique", (1993) pp. 94–103.

Dimitrijevic, D.D. et al., "Routing in Multi–Domain Networks," *IEEE Infocom* '91, Proceedings vol. 1, Bal Harbour, Florida, U.S.A., pp. 0257–0264, (Apr. 7–11, 1991).

Gerla, M. et al., "Congestion Control in Interconnected LANs," *IEEE Network*, vol. 2, No. 1, pp. 72–76 (Jan. 1988).

van As, H.R., "Dynamic Behavior of Network Access Congestion Control Mechanisms," *Computers and Communication Integration, Design, Analysis, Management*, Miami, pp. 20–29, (Apr. 8–10, 1986).

Yegani, P. et al., "Congestion Control Schemes in Prioritized ATM Networks," *Supercomm/ICC*, New Orleans, vol. 2, pp. 1169–1173 (May 1994).

*Primary Examiner*—Benedict V. Safourek
*Assistant Examiner*—Ricky Ngo
*Attorney, Agent, or Firm*—Foley & Lardner

[57] ABSTRACT

In a congestion control method for a system having a first network of one congestion control unit representing a subset of a switching network constituted by a set of switching nodes connected to each other and a second network which serves as a subset of the switching network and does not have a switching node common to the first network, thereby controlling congestion of the first and second networks, the traffic is classified into first traffic generated in the first network and reaching a target switching node of the first network through a switching node in the first network, second traffic having the switching node of the first network as a start point and directed toward the second network, third traffic having a switching node in the second network as a start point and transmitted through a switching node in the second network and a switching node in the first network, and fourth traffic which does not correspond to any one of the first traffic, the second traffic, and the third traffic. Upon occurrence of congestion in the first network, the traffic flow amounts and traffic rates of the first traffic and the second traffic are limited in the first network.

7 Claims, 3 Drawing Sheets

CONGESTION CONTROL METHOD

BACKGROUND OF THE INVENTION

The present invention relates to a congestion control method of controlling the congestion of traffic representing the set of calls generated in a packet-switched network.

In an ATM (Asynchronous Transfer Mode) network, it is known to perform traffic control depending on traffic priority levels in network congestion. This control method is a method of classifying and controlling the priority levels for each medium or each QOS (Quality Of Service). A network generally has congested switching nodes and non-congested switching nodes. Traffic flowing through a congested switching node and traffic flowing through a non-congested switching node cannot be processed with different priority levels.

For example, in connection between LANs (Local Area Networks), when a LANx is connected to a LANy, the traffic in the LANx and the traffic from the LANy to the LANx are adversely affected upon congestion in the LANx.

In this case, the traffic in the LANx and external traffic input to the LANx are controlled in a conventional system without any discrimination therebetween.

Since the traffic in the LANx and the external traffic input to the LANx are controlled in the conventional system without any discrimination therebetween, congestion in the LANx causes congestion in the LANy. The traffic from the LANy further degrades the congestion in the LANx.

When congestion generally occurs, the delay and cell loss which exceed the predetermined values occur to greatly increase the retransmission traffic. For example, when a cell loss increases in a network 1 serving as a subset of a switching network, the traffic transmitted from a network 2 also serving as a subset of the switching network to the network 1 is discarded and retransmitted. By this retransmission, the load of the network 2 as a whole increases to cause congestion in the network 2 accordingly.

When the network 1 is operated in a non-congested state but with an almost overload, the traffic from the network 2 to the network 1 sets the network 1 in the overloaded state to cause the congested state.

In a conventional system, congestion of one network may cause congestion of another network.

SUMMARY OF THE INVENTION

It is, therefore, an object of the present invention to prevent congestion of one network from causing congestion of another network and to prevent the influence of external traffic from causing congestion of a network which receives the external traffic.

In order to achieve the above object of the present invention, there is provided a congestion control method for a system having a first network of one congestion control unit representing a subset of a switching network constituted by a set of switching nodes connected to each other and a second network which serves as a subset of the switching network and does not have a switching node common to the first network, thereby controlling congestion of the first and second networks, comprising the steps of classifying traffic into first traffic generated in the first network and reaching a target switching node of the first network through a switching node in the first network, second traffic having the switching node of the first network as a start point and directed toward the second network, third traffic having a switching node in the second network as a start point and transmitted through a switching node in the second network and a switching node in the first network, and fourth traffic which does not correspond to any one of the first traffic, the second traffic, and the third traffic, and upon occurrence of congestion in the first network, limiting traffic flow amounts and traffic rates of the first traffic and the second traffic in the first network.

DESCRIPTION OF THE PREFERRED EMBODIMENT

The present invention will be described with reference to the accompanying drawings. In a preferred embodiment, ATMs indicate schemes described in references (ATM Forum Document "User Network Interface version 3.0, September 1993" and ITU Document "I.371, 1992").

Figure 1:
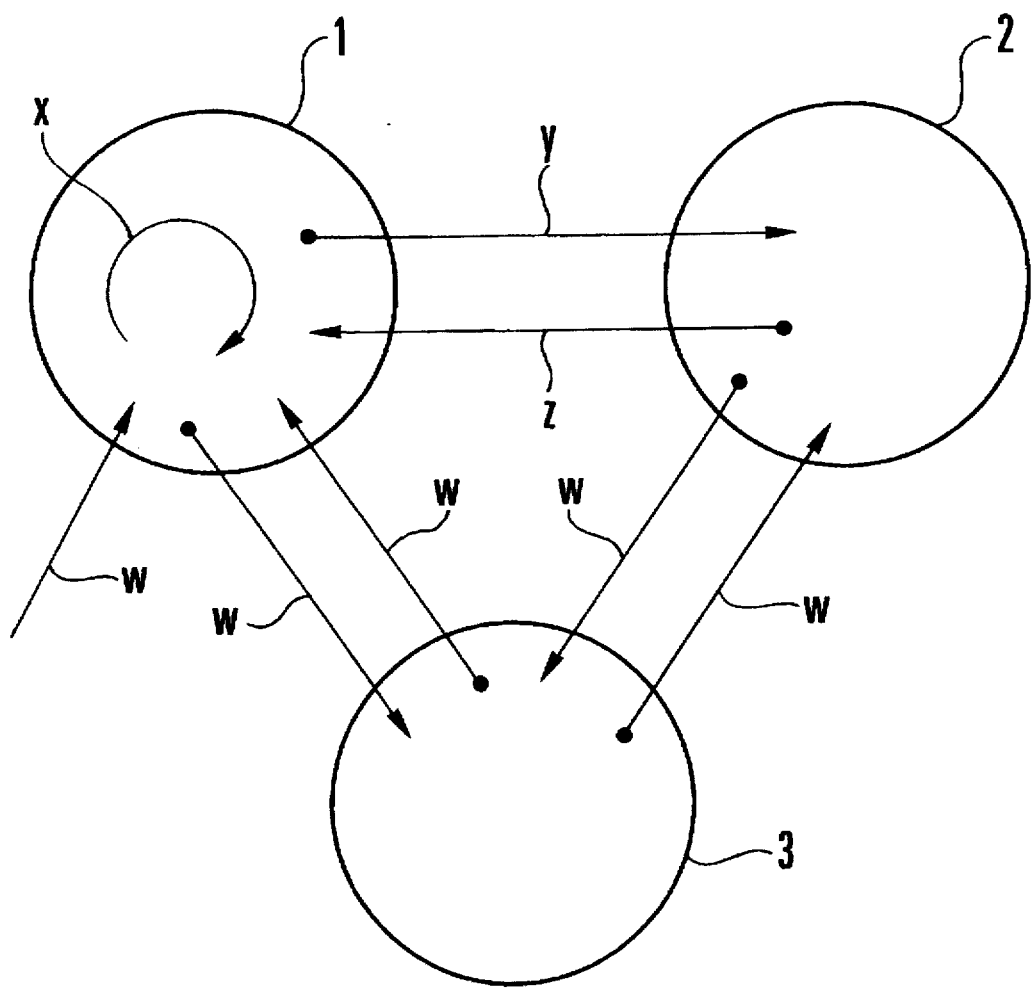
FIG. 1 is a block diagram showing an embodiment of the present invention.

FIG. 1 shows an embodiment of the present invention. Referring to FIG. 1, networks 1, 2, and 3 serving as subsets consisting of switching nodes are partial networks for independently performing identical congestion control.

Figure 4:
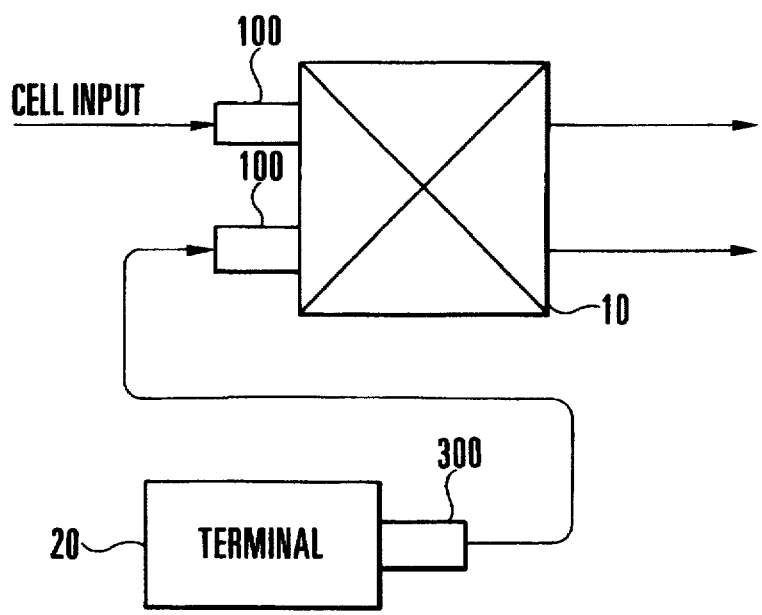
FIG. 4 is a view showing the layout of the congestion controller and the rate controller.

FIG. 4 shows the layout of a congestion controller 100 and a rate controller 300 (both will be described later) which control congestion of the networks 1 to 3. Referring to FIG. 4, the congestion controller 100 is connected to a switching node 10 or a cross-connected node (not shown). The rate controller 300 is located near a terminal 20 between the terminal 20 and a network consisting of the switching nodes 10. An arrangement using a LAN in place of the terminal 20 can be implemented.

Figure 2:
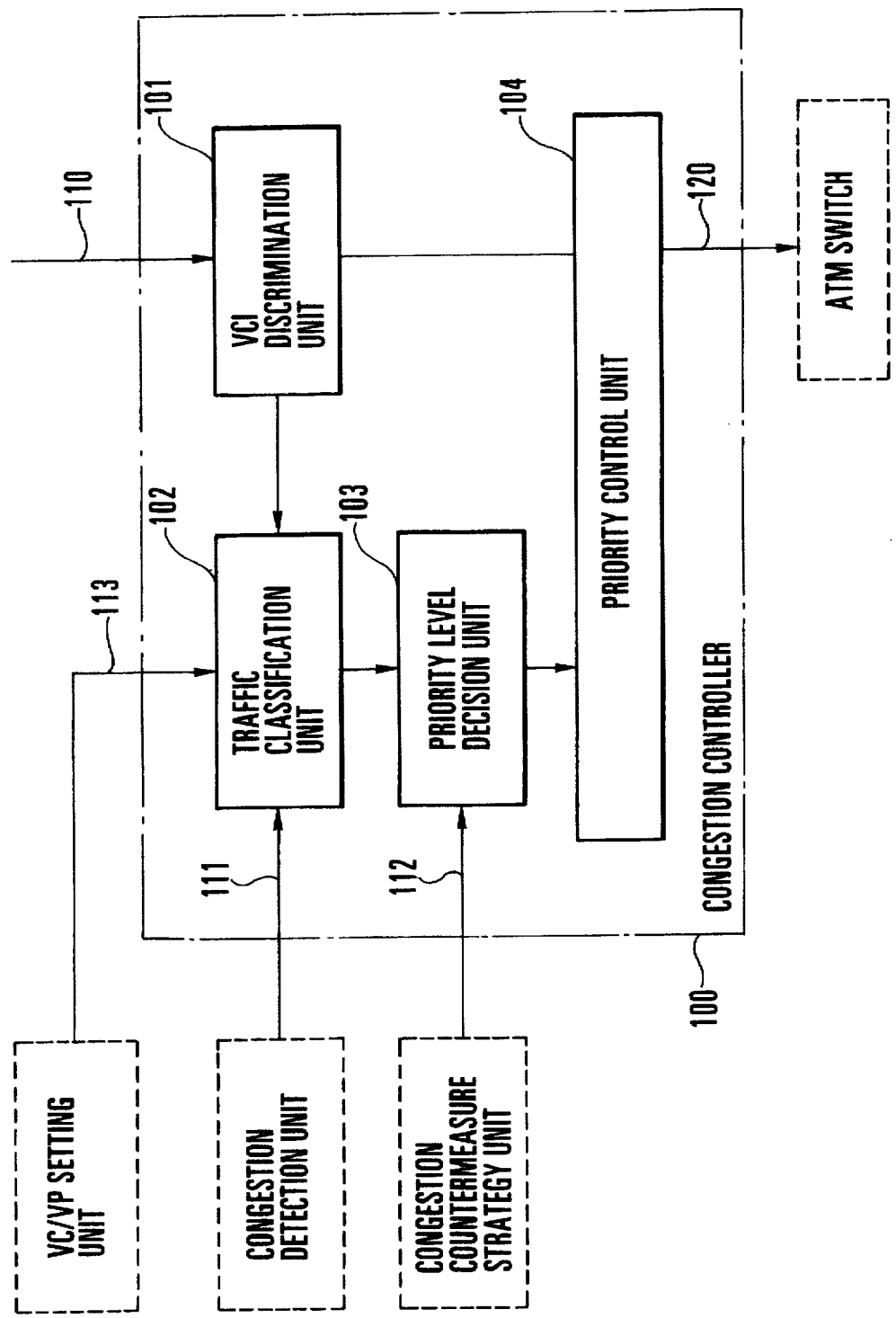
FIG. 2 is a block diagram of a congestion controller constituting a system according to the first embodiment.

FIG. 2 shows the arrangement of the congestion controller 100 according to the first embodiment of the present invention. The congestion controller 100 shown in FIG. 2 is located at the entrance of a network in which congestion occurs in a switching node 10, a cross-connected node, or the like to control the traffic input to the switching node 10, as shown in FIG. 4.

Referring to FIG. 2, the congestion controller 100 comprises a VCI (Virtual Channel Identifier) discrimination unit 1 for discriminating a VCI in an ATM cell, a traffic classification unit 102, a priority level decision unit 103, and a priority control unit 104. A cell input line 110, a congested state signal line 111, a congestion countermeasure strategy signal line 112, and a control line 113 are connected to the congestion controller 110 as the input lines. A cell output line 120 is connected to the congestion controller 100 as the output line.

The VCI value of a cell input through the cell input line 110 is detected by the VCI discrimination unit 101. The detected VCI value is sent to the traffic classification unit 102, and the cell itself is sent from the VCI discrimination unit 101 to the priority control unit 104.

The traffic classification unit 102 maps a traffic class on the basis of the VCI value. In allocating a VCI value to each traffic, a VC/VP setting unit classifies the traffic in accordance with a route of a call in call setting or cross-connection setting.

More specifically, as shown in FIG. 1, traffic closed in a network 1 is defined as traffic x. Traffic directed from the network 1 to a network 2 is defined as traffic y. Traffic generated in the network 2 is defined as traffic z. Any other traffic is defined as traffic w.

These traffic classes are stored in the traffic classification unit 102 through the control line 113.

When mapping in the traffic classification unit 102 is completed, the traffic classification result is sent from the traffic classification unit 102 to the priority level decision unit 103.

The priority level decision unit 103 decides a priority process for the corresponding cell on the basis of the input information through the congestion countermeasure strategy signal line 112 and the traffic classification result. The information input from the congested state signal line 111 to the traffic classification unit 102 represents a congested state. For example, only when a buffer full signal of a buffer in an ATM switch is detected the number of times corresponding to a threshold value within a predetermined period of time, information representing congestion is generated. Upon occurrence of congestion, the information from the congestion countermeasure strategy signal line 112 becomes valid, and this valid information is transmitted to the priority level decision unit 103. Note that the information from the congestion countermeasure strategy signal line 112 is information representing a priority control policy. This policy is predetermined as follows.

For example, a CLP (Cell Loss Priority) bit for the traffic x changes from "0" to "1", but the CLP bits for the traffic y, the traffic z, and the traffic w have no change.

In addition, a combination of operations of the CLP bits and operations of EFCN (Explicit Forward Congestion Notification) and EBCN (Explicit Backward Congestion Notification) bits may be used as a policy. The method of using this CLP bit is described in a reference (ITU Document "I.371, 1993"). A method of using the EFCN and EBCN bits is described in a reference ("Technical outputs and issues at the ATM Forum", Kazuo Imai, Technical Report of the Institute of Electronics, Information, and Communication Engineers, Information Network IN-94-39, May 13, 1994).

In this embodiment, the CLP bit for the traffic x changes from "0" to "1", and the EFCN and EBCN bits for the traffic x change from "0" to "1". However, the CLP, EFCN, and EBCN bits for the traffic y, the traffic z, and the traffic w do not change.

In this manner, the detailed priority control for an input cell can be known on the basis of the priority control policy upon occurrence of congestion.

Upon completion of priority level decision mapping on the basis of the above priority control policy in the priority level decision unit 103, the priority level decision result is sent from the priority level decision unit 103 to the priority control unit 104. The priority control unit 104 performs one or both of the following two procedures to output the cell sent from the VCI discrimination unit 101 to the cell output line 120.

As the first procedure, priority control operations such as the operations of CLP, EFCN, and EBCN bits are performed for the cell sent from the VCI discrimination unit 101, as described in the following references (Hideo Tominaga et. al., "Easy-to-understand BIDN Technique", Ohm-sha, Oct. 25, 1993; "Standardization Aspects of Congestion Control Schemes for Best Effort Class in ATM Networks", Chinatsu Ikeda, Technical Report of the Institute of Electronics, Information, and Communication Engineers, Information Network IN-94-41, May 13, 1994). That is, the corresponding bit of a cell header is changed on the basis of the priority level decision result. The CLP bit represents low priority level for "1"; and high priority level for "0". Each of the EFCN and EBCN bits represents regulation for "1"; and no regulation for "0".

As the second procedure, in a non-standard cell format having a structure obtained by adding an ATM non-standard header to a cell used in a switching unit or cross-connection unit, the same procedure as in the first procedure is performed for bits corresponding to the above-mentioned CLP, EFCN, and EBCN bits of the added non-standard header portion.

The priority level of the traffic associated with the network 1 is changed in the network 1 to change the degree of influence of congestion of the network 1 on the network 2. As a result, when the traffic generated in the network 1 has the low priority level, the influence of congestion of the network 1 on the network 2 can be reduced. Therefore, a possibility of the influence of congestion of the network 1 on the network 2 can be reduced.

In the above description, the CLP bit for the traffic x changes from "0" to "1", but the CLP bits for the traffic y, the traffic z, and the traffic w do not change. Instead, if the CLP bits for the traffic y, the traffic z, and the traffic w change from "0" to "1", but the CLP bit for the traffic x does not change, the low priority level is given to external traffic input to the network 1. Therefore, congestion can be prevented while eliminating the congestion caused in the network 1.

Figure 3:
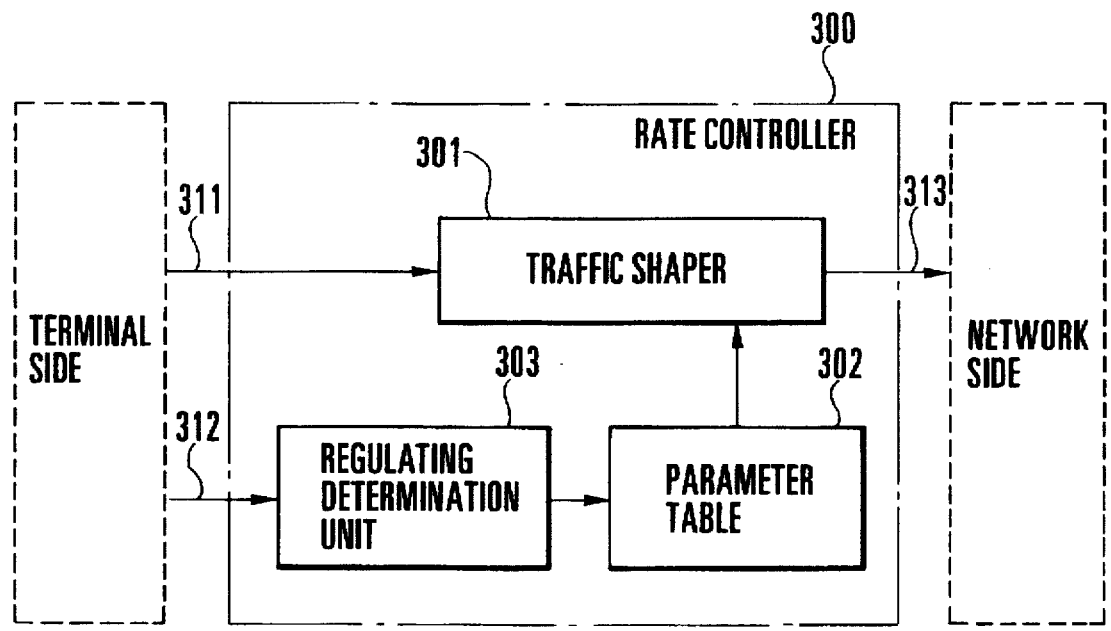
FIG. 3 is a block diagram of a rate controller constituting a system according to the second embodiment.

FIG. 3 shows the rate controller 300 according to the second embodiment of the present invention. The rate controller 300 is located between the interface of a network 2 and a terminal connected to the network 2 shown in FIG. 1 to regulate the flow amount and peak rate of traffic.

More specifically, the rate controller 300 sets the transmission rate of the ATM cells output from the terminal and monitors whether the ATM cells are output at the predetermined rate. The rate controller 300 comprises a traffic shaper 301, a traffic parameter table 302, and a traffic regulating determination unit 303. The rate controller 300 has inputs of an input signal 311 and a congestion notification signal 312 of the ATM cell from the terminal and outputs a cell signal 313.

In the ATM network, network congestion information sent to the terminal is superposed and delivered on a cell received at the terminal. The terminal sends the congestion notification signal 312 to the rate controller 300 to notify the congested state of the network to the rate controller 300. In this case, the regulating determination unit 303 determines the rate to be used in congestion, using this congestion notification, and sends new rate information to the parameter table 302.

The parameter table 302 replaces the current rate parameters with new rate parameters. At the same time, the traffic shaper 301 shapes the traffic using the rate value stored in the parameter table 302.

The traffic shaping operation is performed using a scheme described in a reference ("Pierre E. Boyer et. al., "Spacing Cells Protects and Enhances Utilization of ATM Network Links", IEEE Network, September 1992"). In this case, the parameters are a peak cell rate and a sustainable cell rate which are designated in a reference (ATM Forum Document "User Network Interface version 3.0, September 1993").

The regulating determination unit 303 decreases the peak rate of the traffic through the network 1 upon occurrence of congestion to limit the traffic rate, thereby reducing the sustainable cell rate and hence limiting the traffic flow amount.

By the above operation, the traffic from the network 2 to the network 1 can be reduced, so that congestion in the network 1 can be eliminated. Therefore, a possibility for causing the network 2 to further degrade the congestion of the network 1 can be reduced.

The rate controller 300 can be arranged on the terminal side between the network 1 shown in FIG. 1 and the terminal connected to the network 1, and the flow amount and peak rate of the traffic for the network 1 are limited, and only the traffic associated with the network 1 is limited to eliminate congestion of the network 1. The influence of communication from the network 2 to the network 1 can be reduced. Therefore, a possibility of the influence of congestion of the network 1 on the network 2 can be reduced.

As has been described above, according to the present invention, the traffic flow amount and the traffic rate of the traffic associated with the first network are limited in the first network to eliminate congestion of the first network. At the same time, an influence on communication from the second network to the first network can be reduced. Therefore, a possibility of an influence of congestion of the first network on the second network can be reduced.

The priority level of the traffic associated with the first network is changed in the first network to change the degree of influence of congestion of the first network on the second network. For example, when the low priority level is given to the traffic generated in the first network, the influence of congestion of the first network on the second network can be reduced. To the contrary, when the low priority level is given to external traffic input to the first network, the congestion caused in the first network can be eliminated, thereby eliminating the congestion. Therefore, a possibility of an influence of congestion of the first network on the second network or a possibility for causing the second network to further degrade the congestion of the first network can be reduced.

Since the traffic input from the second network to the first network can be reduced in the first network, congestion in the first network can be eliminated. Therefore, a possibility of causing the second network to further degrade congestion of the first network can be reduced.

A possibility of an influence of congestion of the first network on the second network or a possibility of causing the second network to further degrade congestion of the first network can be reduced. Therefore, the congestion control effect can be further enhanced.

What is claimed is:

1. A congestion control method for a system having a first network of one congestion control unit representing a subset of a switching network constituted by a set of switching nodes connected to each other and a second network which serves as a subset of the switching network and does not have a switching node common to the first network, thereby controlling congestion of the first and second networks, comprising the steps of:

classifying traffic into first traffic generated in the first network and reaching a target switching node of the first network through a switching node in the first network, second traffic having the switching node of the first network as a start point and directed toward the second network, third traffic having a switching node in the second network as a start point and transmitted through a switching node in the second network and a switching node in the first network, and fourth traffic which does not correspond to any one of the first traffic, the second traffic, and the third traffic; and upon occurrence of congestion in the first network, limiting traffic flow amounts and traffic rates of the first traffic and the second traffic in the first network.

2. A congestion control method for a system having a first network of one congestion control unit representing a subset of a switching network constituted by a set of switching nodes connected to each other and a second network which serves as a subset of the switching network and does not have a switching node common to the first network, thereby controlling congestion of the first and second networks, comprising the steps of:

classifying traffic into first traffic generated in the first network and reaching a target switching node of the first network through a switching node in the first network, second traffic having the switching node of the first network as a start point and directed toward the second network, third traffic having a switching node in the second network as a start point and transmitted through a switching node in the second network and a switching node in the first network, and fourth traffic which does not correspond to any one of the first traffic, the second traffic, and the third traffic; and upon occurrence of congestion in the first network, independently controlling priority levels of the first traffic, the second traffic, the third traffic, and the fourth traffic in the first network.

3. A congestion control method for a system having a first network of one congestion control unit representing a subset of a switching network constituted by a set of switching nodes connected to each other and a second network which serves as a subset of the switching network and does not have a switching node common to the first network, thereby controlling congestion of the first and second networks, comprising the steps of:

classifying traffic into first traffic generated in the first network and reaching a target switching node of the first network through a switching node in the first network, second traffic having the switching node of the first network as a start point and directed toward the second network, third traffic having a switching node in the second network as a start point and transmitted through a switching node in the second network and a switching node in the first network, and fourth traffic which does not correspond to any one of the first traffic, the second traffic, and the third traffic; and upon occurrence of congestion in the first network, limiting a traffic flow amount and a traffic rate of the third traffic in the second network.

4. A method according to claim 1, further comprising the step of independently controlling priority levels respectively given to the first traffic, the second traffic, the third traffic, and the fourth traffic in the first network upon occurrence of congestion in the first network.

5. A method according to claim 1, further comprising the step of limiting a traffic flow amount and a traffic rate of the third traffic in the second network upon occurrence of congestion in the first network.

6. A method according to claim 2, further comprising the step of limiting a traffic flow amount and a traffic rate of the third traffic in the second network upon occurrence of congestion in the first network.

7. A method according to claim 4, further comprising the step of limiting a traffic flow amount and a traffic rate of the third traffic in the second network upon occurrence of congestion in the first network.

* * * * *